US006981379B2

(12) United States Patent
Ikuma et al.

(10) Patent No.: US 6,981,379 B2
(45) Date of Patent: Jan. 3, 2006

(54) POWER SUPPLY SYSTEM

(75) Inventors: Hitoshi Ikuma, Tokyo (JP); Makoto Inoue, Tokyo (JP)

(73) Assignee: The Japan Research Institute, Limited, Tokyo (JP)

( * ) Notice: Subject to any disclaimer, the term of this patent is extended or adjusted under 35 U.S.C. 154(b) by 0 days.

(21) Appl. No.: 10/898,390

(22) Filed: Jul. 23, 2004

(65) Prior Publication Data

US 2005/0019621 A1 Jan. 27, 2005

Related U.S. Application Data

(60) Provisional application No. 60/489,836, filed on Jul. 23, 2003.

(51) Int. Cl.
*F01B 21/04* (2006.01)
*H01M 8/04* (2006.01)

(52) U.S. Cl. ............................ 60/706; 429/12; 429/22

(58) Field of Classification Search .................. 60/698, 60/706; 429/12, 22
See application file for complete search history.

(56) References Cited

U.S. PATENT DOCUMENTS

| | | | | |
|---|---|---|---|---|
| 5,170,124 A * | 12/1992 | Blair et al. | ................. | 324/434 |
| 5,763,113 A * | 6/1998 | Meltser et al. | ................ | 429/13 |
| 6,406,806 B1 * | 6/2002 | Keskula et al. | ............... | 429/13 |
| 6,528,192 B2 * | 3/2003 | Lacy et al. | .................... | 429/13 |
| 6,893,756 B2 * | 5/2005 | Clingerman et al. | .......... | 429/22 |

FOREIGN PATENT DOCUMENTS

| | | |
|---|---|---|
| JP | 04-299025 | 10/1992 |
| JP | 06-338341 | 12/1994 |
| JP | 08-236134 | 9/1996 |
| JP | 2001-023667 | 1/2001 |
| JP | 2002-334711 | 11/2002 |
| WO | WO 0173879 A1 | 10/2001 |

* cited by examiner

*Primary Examiner*—Hoang Nguyen
(74) *Attorney, Agent, or Firm*—J.C. Patents

(57) ABSTRACT

To provide a power supply system that allows the current maximum power generation capability to be easily recognized, this power supply system includes a plurality of fuel cells for generating power and supplying the power to loads; a performance storage section for storing a maximum power value indicating a maximum value of a power generation ability of each fuel cell; a test device for sequentially performing maximum power generation testing on at least one of the fuel cells at a predetermined time interval; an update section for updating the maximum power value of each fuel cell, the maximum power value being stored on the performance storage section, according to a result of the performance test; a power-generation-amount detection section for detecting the total of amounts of power generated and supplied by the fuel cells to the loads; and a surplus-power determination section for determining surplus power, which can be excessively generated by the power supply system, at the predetermined time interval based on a difference between the total of the maximum power values stored on the performance storage section and the total of amounts of the power generated.

27 Claims, 4 Drawing Sheets

POWER SUPPLY SYSTEM

CROSS-REFERENCE TO RELATED APPLICATIONS

The present application claims benefit of U.S. Provisional Application No. 60/489,836, filed on Jul. 23, 2003.

TECHNICAL FIELD

The present invention relates to power supply systems for supplying power to loads. In particular, the present invention relates to a power supply system having a plurality of fuel cells.

BACKGROUND ART

Conventionally, a power supply system that includes a plurality of fuel cells and that supplies power to loads has been available. In such a power supply system, the total power supply capability thereof can be given by the total of power generation capabilities of the individual fuel cells.

A load having a smaller demand than the total power supply capability is selected and the load is connected to the power supply system. By setting the total power supply capability of the power supply system relatively higher than the demand of the loads, the power supply system can supply power to the loads stably.

The total power supply capability of the known power supply system is determined from a power generation capability at the time of installation of individual fuel cells. As a result, it is difficult to know the current total power supply capability of the power supply system. For example, even when the power generation capability decreases due to deterioration of the fuel cells, the total power supply capability of the power supply system is recognized as a value that is the same as that at the time of installation.

Consequently, when time has elapsed after the installation of the power supply system and the power generation capability of the fuel cells decreases, intended generation power may not obtained, thereby resulting in an insufficient power to be supplied to the loads. As a result, it has been difficult to supply power to the loads stably. In addition, it has been difficult to recognize a surplus-power generation capability of the power supply system.

Accordingly, an object of the present invention is to overcome such problems.

DISCLOSURE OF THE INVENTION

To overcome the foregoing problems, one aspect of the present invention provides a power supply system that supplies power to loads. The power supply system includes a plurality of fuel cells for generating power and supplying the power to the loads; a performance storage section for storing a maximum power value indicating a maximum value of a power generation ability of each of the fuel cells; a test device for sequentially performing maximum power generation testing on at least one of the fuel cells at a predetermined time interval; an update section for updating the maximum power value of each of the fuel cells, the maximum power value being stored on the performance storage section, according to a result of the performance test; a power-generation-amount detection section for detecting a total of amounts of power generated and supplied by the fuel cells to the loads; and a surplus-power determination section for determining surplus power, which can be excessively generated by the power supply system, at the predetermined time interval based on a difference between a total of the maximum power values stored on the performance storage section and the total of amounts of the power generated.

The power supply system may further include a selection section for selecting one or more fuel cells including the fuel cell to be tested by the test device, from the plurality of fuel cells, so that the total of the maximum power values of the selected fuel cells is greater than the demand of the loads and the number of selected fuel cells is a minimum, to cause the selected fuel cell to generate power; and a selection change section for sequentially changing the fuel cell selected by the selection section at the predetermined time interval to cause the test device to test all the fuel cells.

The selection section may preferentially select the fuel cell having large maximum power value as well as the fuel cell to be tested. Preferably, when the maximum power value of the fuel cell becomes less than a predetermined value, the selection section does not select the fuel cell.

The power supply system further includes a request receiving section for receiving a request for power from outside in a case of emergency. When the maximum power value becomes less than the predetermined value, the selection section causes the fuel cell only in the case of emergency to generate power and supplies the power, generated by the fuel cell, to outside. The power supply system may further include a control section. When a request for power that is less than the surplus power is received from outside, the control section causes the fuel cells to generate power according to the request from the outside and to supply the power to outside.

The surplus-power determination section may calculate a probability of power shortage to be supplied to the loads, based on the surplus power, and when the probability of power shortage to be supplied to the loads exceeds a predetermined value, an alarm indicating so may be issued to outside. The surplus-power determination section may calculate the probability of power shortage to be supplied to the loads, based on power transition data, which is an estimate of transition of demand of the loads.

The performance storage section may further store a failure probability of each fuel cell. Based on the failure probability, the surplus-power determination section may calculate the probability of power shortage to be supplied to the loads.

The power supply system may further include a load control section. When power is supplied to the plurality of loads and the probability of power shortage is greater than or equal to a predetermined value, the load control section causes power not to be supplied to predetermined non-significant ones of the plurality of loads.

The power supply system may further include a cell switch section for splitting the plurality of fuel cells into a high-reliability cell group of which maximum power value is greater than or equal to a predetermined value and a low-reliability cell group of which maximum power value is less than the predetermined value, to supply power to the plurality of loads; and a load control section for connecting predetermined significant ones of the plurality of loads to the high-reliability cell group and connecting non-significant loads other than the significant loads to the low-reliability cell group.

When the probability of power shortage exceeds a predetermined probability, the cell switch section may split the plurality of fuel cells into the high-reliability cell group and the low-reliability cell group. When the cell switch section splits the plurality of fuel cells into the high-reliability cell group and the low-reliability cell group, the load control section may connect predetermined significant ones of the plurality of loads to the high-reliability cell group and may connect non-significant loads other than the significant loads to the low-reliability cell group.

When a total demand of the significant loads is greater than a total power generation capacity of the high-reliability cell group, the cell switch section may cause, of the fuel cells belonging to the low-reliability cell group, the fuel cell having the greatest maximum power generation capacity to belong to the high-reliability cell group.

When a total demand of the significant loads is greater than a total power generation capacity of the high-reliability cell group, the load control section may connect, of the significant loads, the predetermined load having a lowest significance to the low-reliability cell group as the non-significant loads.

The power supply system may further include a high-reliability power network, to which the high-reliability cell group and the significant loads are connected, for supplying power generated by the high-reliability cell group to the significant loads; and a low-reliability power network, to which the low-reliability cell group and the non-significant loads are connected, for supplying power generated by the low-reliability cell group to the non-significant loads.

The summary of the invention does not necessarily describe all necessary features of the present invention. The present invention may also be a sub-combination of the features described above.

BEST MODE FOR CARRYING OUT THE INVENTION

The invention will now be described based on the preferred embodiments, which do not intend to limit the scope of the present invention, but exemplify the invention.

All of the features and the combinations thereof described in the embodiment are not necessarily essential to the invention.

Figure 1:
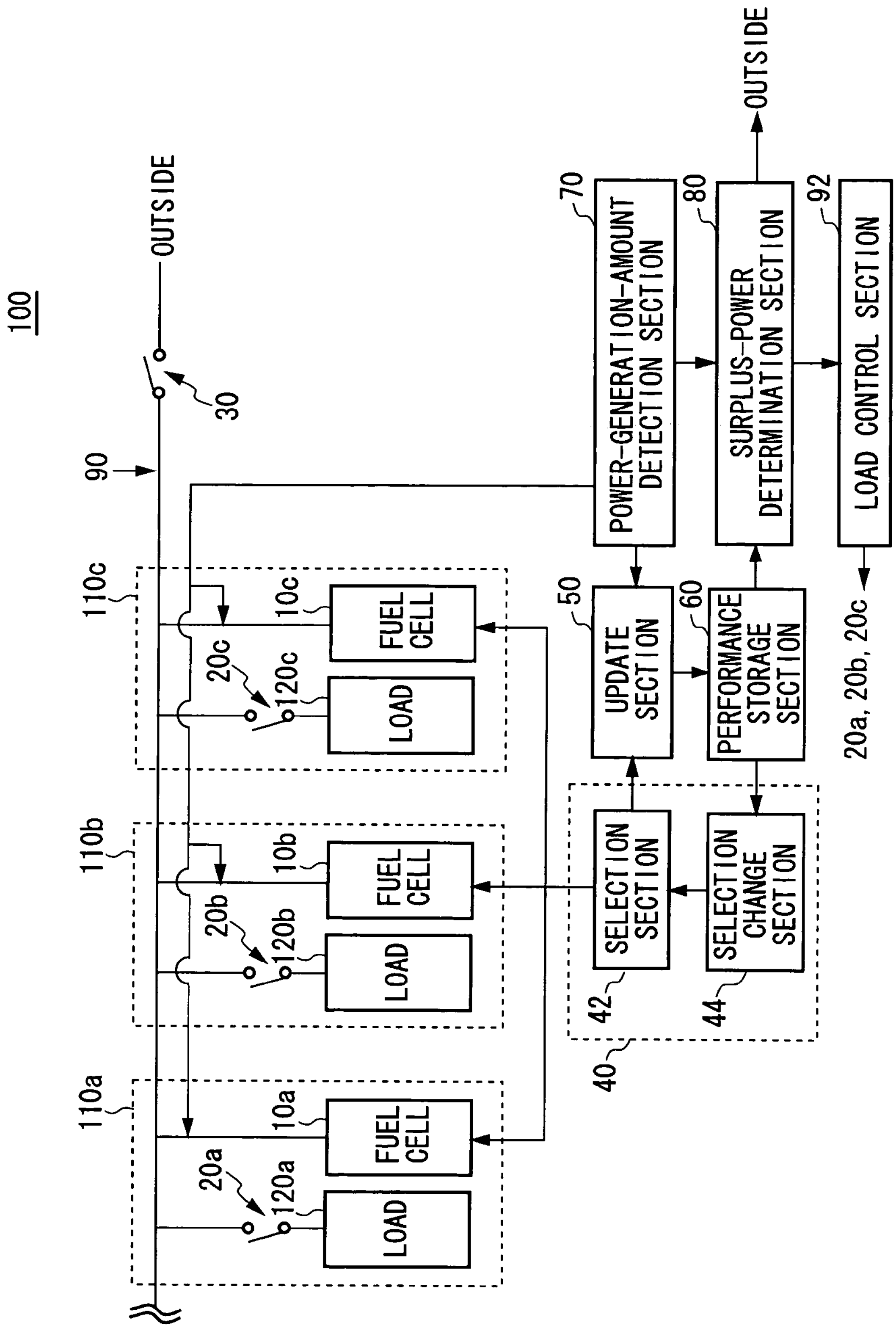
FIG. 1 shows a configuration of a power supply system 100 according to an embodiment of the present invention.

FIG. 1 shows one example of the configuration of a power supply system 100 according to the present invention. The power supply system 100 according to the example supplies power to loads (120*a*, 120*b*, and 120*c*, which are hereinafter generally referred to as "120") provided at a plurality of houses (110*a*, 110*b*, and 110*c*, which are hereinafter generally referred to as "110"). The power supply system 100 includes a plurality of fuel cells (10*a*, 10*b*, and 10*c*, which are hereinafter generally referred to as "10"), a performance storage section 60, a test device 40, an update section 50, a power-generation-amount detection section 70, a surplus-power determination section 80, and a load control section 92.

The fuel cells 10 are provided at the respective houses 110 so as to correspond to the loads 120 to supply power to the loads 120. For example, the fuel cells 10 and the loads 120 are connected to a power network 90, which allows power to be transferred between the houses.

The loads 120 are connected to the power network 90 via respective switch sections (20*a*, 20*b*, and 20*c*, which are hereinafter generally referred to as "20"). For example, when the amount of power supplied to the fuel cells 10 is insufficient, the switch sections 20 connect only a significant load or significant loads 120 to the power network 90 to supply power thereto.

The performance storage section 60 stores performance values of each fuel cell 10. For example, the performance storage section 60 stores a maximum power value indicating a maximum value of power generation capacity of each fuel cell 10. The performance storage section 60 may further store the failure probability of each fuel cell 10 and may further store the start-up time of each fuel cell 10. For those values, a predetermined initial performance values may be stored previously, or performance values measured through testing may be stored previously. The performance storage section 60 may further store the cumulative amount of generated power and/or the cumulative operating time of each fuel cell 10.

The power-generation-amount detection section 70 detects the amount of power and the total of the amounts, which is generated and supplied by each fuel cell 10 to the load 120. Based on a difference between the total of maximum power values of the respective fuel cells 10 and the total of amounts of power generated by the fuel cells 10, the surplus-power determination section 80 determines surplus power that can be excessively generated by the power supply system 100.

The surplus-power determination section 80 informs the determined surplus power to outside. For example, according to the information on the surplus power, a user of the power supply system 100 may select a load that is to be further connected to the power supply system 100. When the power supply system 100 is connected to another power supply system, the latter power supply system may issue a request for power less than or equal to that surplus power to the power supply system 100.

The power supply system 100 may further include a control section so that, upon receiving a request for power less than the surplus power from outside, the control section causes the fuel cells 10 to generate power according to the request from the outside and to supply the power to outside. For example, the test device 40 may serve as the control section.

The test device 40 sequentially performs maximum power generation testing on at least one of the fuel cells 10 at a predetermined time interval. That is, the test device 40 sequentially performs maximum power generation testing on one or more of the fuel cells 10 at a predetermined time interval, to thereby perform maximum power generation testing on all the fuel cells 10. For example, the test device 40 may perform the maximum power generation testing at an interval of one week, one month, or the like. The test device 40 includes a selection section 42 and a selection change section 44. The selection section 42 selects any of the fuel cells 10 so that the selected fuel cell(s) 10 generate power and supply the power to the loads 120. The selection change section 44 changes the fuel cell(s) 10 selected by the selection section 42.

During the normal operation, the selection section 42 may control the amount of power generated by each fuel cell 10 so that the power generation efficiency of the plurality of fuel cells 10 is maximized relative to the total demand of the plurality of loads 120.

During the testing, in order that the total of maximum power values of the selected ones of the plurality of fuel cells 10 is greater than the total of demand of the plurality of loads 120 and that the number of the fuel cells to be selected is a minimum, the selection section 42 selects one or more fuel cells including the fuel cell 10 to be tested, from the plurality of fuel cells 10. That is, in addition to one or more fuel cells 10 to be tested, the selection section 42 selects some of the fuel cells 10 that are to generate power, according to the demand of the loads 120.

Then, the selection section 42 causes the fuel cell 10 to be tested to generate maximum power and causes the other fuel cells 10 to generate power according to the demand of the loads 120. The power-generation-amount detection section 70 detects the amount of power generated by the fuel cell 10 that has been selected for generating maximum power, and the update section 50 updates the performance values of the fuel cell 10, the values being stored on the performance storage section 60, according to the result of the performance test. At this point, the power-generation-amount detection section 70 may further detect the start-up time of the fuel cell 10 so that the update section 50 updates the start-up time of the fuel cell 10.

In addition to the fuel cell 10 selected for the testing, the power-generation-amount detection section 70 may also detect the power generated by the fuel cells 10 that are generating maximum power. In this case, the performance values of the fuel cells 10 can also be updated. With respect to such fuel cells 10, it is preferable that the selection section 42 controls the amount of power generated by each fuel cell 10 so that the number of fuel cells 10 that generate maximum power becomes a maximum. That is, the selection section 42 may select a maximum number of fuel cells, including the fuel cell 10 to be tested, so that the total of the amounts of maximum power generated does not exceed the total demand of the loads 120, may cause the selected fuel cells 10 to generate maximum power, and may further select another fuel cell 10 so as to generate power corresponding to a shortage. The selection section 42 may preferentially select a fuel cell 10, of which maximum power value stored on the performance storage section 60 is large, as well as the fuel cell 10 to be tested. By prioritizing the selection of a high-performance fuel cell 10, the deterioration of the individual fuel cells 10 can be equalized.

The selection section 42 may cause the fuel cell 10 selected during the testing to continue power generation during a normal operation. In this case, at a predetermined time interval in which testing is to be performed, the selection change section 44 sequentially changes the fuel cells 10 selected by the selection section 42, so as to cause the test device 40 to test all the fuel cells 10.

When a performance value stored on the performance storage section 60 is updated, at a predetermined time interval for testing, the surplus-power determination section 80 determines surplus power that can be excessively generated by the power supply system 100.

Such an operation allows for testing without disconnecting the fuel cells 10 from the loads 120. This makes it possible to test each fuel cell 10 while supplying power to the loads 120 stably. For example, the fuel cells 10 can be tested even during daytime when the demand of the loads 120 is high. Additionally, this arrangement makes it possible to keep track of the current maximum power generation capability of the power supply system 100 and to keep track of the surplus-power generation capability of the power supply system 100.

When the test result shows that a performance value of a fuel cell 10 becomes less than a predetermined value, it is preferable that the selection section 42 does not select the fuel cell 10 in question. For example, when the maximum power value of a fuel cell 10 becomes less than a predetermined value, the reliability of the fuel cell 10 also decreases correspondingly. Thus, it is preferable that that fuel cell 10 is not used also during normal power generating operation. In this case, it is preferable that the power supply system 100 issues an alarm urging the replacement of the fuel cell 10 to the user.

When a fuel cell 10, of which the performance value is smaller than a predetermined value, has not been replaced, the selection section 42 may cause that fuel cell 10 to generate power only in the case of emergency so that the fuel cell 10 supplies the generated power to outside. For example, the selection section 42 causes the deteriorated fuel cell 10 to generate power only when a request for power is received from outside in case of emergency such as a disaster. In this case, the selection section 42 serves as a request receiving section that receives the request for power from outside. This arrangement makes it possible to make effective use of a fuel cell 10 having deteriorated performance. When power is supplied to outside, a switch section 30 connects the power network 90 to an external load.

Based on the determined surplus power, the surplus-power determination section 80 calculates the probability of the power shortage to the loads 120. When the probability exceeds a predetermined value, it is preferable that an alarm indicating the power shortage will be issued to outside. The probability of power shortage to be supplied to the loads 120 can easily be determined based on the surplus power and the failure probability of each fuel cell 10.

Additionally, the surplus-power determination section 80 may also calculate the probability of power shortage to be supplied to the loads 120, based on power transition data, which is an estimate of transition of demand of the loads 120. The power transition data may be data that is prepared based on the transition of past demand of the loads 120.

Upon receiving an alarm indicating a possible power shortage, the user can disconnect a desired load 120 from the power network 90. When the power-shortage probability is greater than or equal to a predetermined probability, the load control section 92 may also control the corresponding switch section 20 so that no power is supplied to predetermined non-significant ones of the plurality of loads 120. The load control section 92 decreases the total demand of the loads 120 by disconnecting a non-significant load, thereby increasing surplus power to decrease the probability of power failure.

Figure 2:
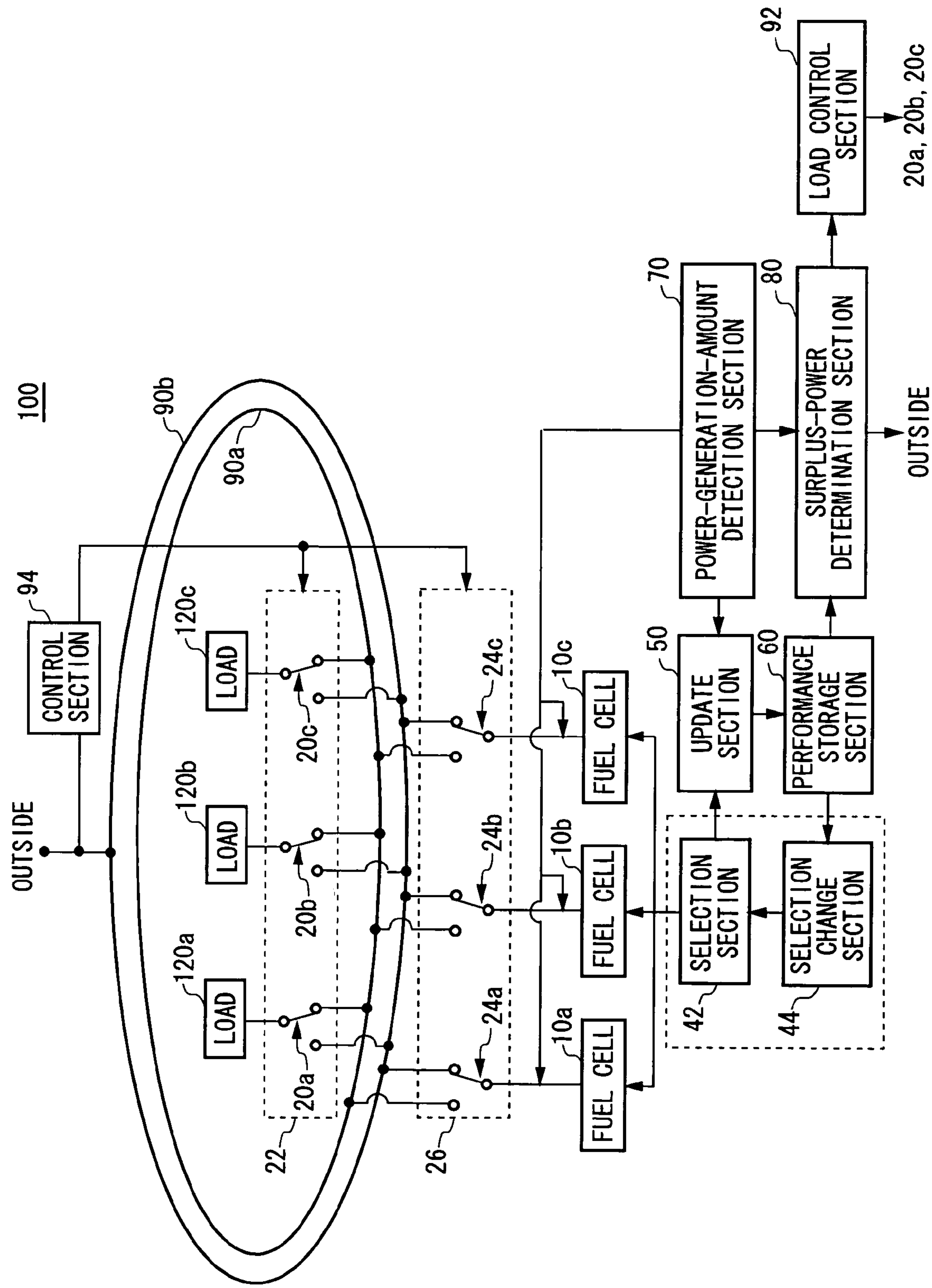
FIG. 2 shows another example of the configuration of the power supply system 100.

FIG. 2 shows another example of the configuration of the power supply system 100. The power supply system 100 in this example includes a high-reliability power network 90*a* and a low-reliability power network 90*b* instead of the power network 90 in the power supply system 100 illustrated in FIG. 1, and further includes a control section 94, a switch section 22, and a cell switch section 26.

The low-reliability power network 90*b* receives power from an external power source. The external power source is a power source which supplies power to the low-reliability power network 90*b* from outside. For example, the external power source may be another power supply system 100 or may be a commercial power supply or the like. The high-reliability power network 90*a* is a power network that is provided independently of the low-reliability power network 90*b*.

The plurality of fuel cells 10 and the plurality of loads 120 are connected to either the high-reliability power network 90*a* or the low-reliability power network 90*b*.

The control section 94 determines whether the external power source is operating normally or not, based on power supplied from the external power source to the low-reliability power network 90*b*. When the control section 94 determines that the external power source is operating normally, the switch section 22 and the cell switch section 26 connect the plurality of fuel cells 10 and the plurality of loads 120 to the low-reliability power network 90*b*, and cause the external power source and the plurality of fuel cells 10 to supply power to the plurality of loads 120.

When the control section 94 determines that the external power source is malfunctioning, the switch section 22 and the cell switch section 26 connect the plurality of fuel cells 10 and the plurality of loads 120 to the high-reliability power network 90*a*, and cause the plurality of fuel cells 10 to supply power to the plurality of loads 120. The switch section 22 has a plurality of switching means 20 for switching the connections of the plurality of loads 120, and the cell switch section 26 has a plurality of switching means 24 for switching the connections of the plurality of fuel cells 10.

That is, at least one of the fuel cells 10 continuously supplies power to the loads 120. As a result, the testing of the fuel cells 10 which has been illustrated in FIG. 1 can be efficiently performed. Additionally, such controlling allows the external power source and the fuel cells 10 to be connected to another network during malfunction. Consequently, it is possible to prevent power from flowing back from the fuel cells 10 to the external power source during malfunction of the external power source, thereby allowing at least one of the fuel cells 10 to operate continuously.

As described above, the power supply system 100 in this example allows for efficient testing of the fuel cells 10.

Further, when the plurality of fuel cells 10 mainly supply power to the plurality of loads 120 and supplemental power is received from outside, the cell switch section 26 splits the plurality of fuel cells 10 into a high-reliability cell group and a low-reliability cell group based on the respective performance values. For example, the cell switch section 26 splits the plurality of fuel cells 10 into a high-reliability cell group, of which the maximum power value is greater than or equal to a predetermined value, and a low-reliability cell group, of which the maximum power value is less than the predetermined value. The cell switch section 26 then connects the high-reliability cell group to the high-reliability power network 90*a* and connects the low-reliability cell group to the low-reliability power network 90*b*.

Of the plurality of loads 120, the load control section 92 connects predetermined significant loads to the high-reliability power network 90*a* and connects non-significant loads other than the significant loads to the low-reliability power network 90*b*. As a result, the high-reliability cell group and the significant loads are connected to the high-reliability power network 90*a*, so that power generated by the high-reliability cell group is supplied to the significant loads. Also, the low-reliability cell group and the non-significant loads are connected to the low-reliability power network 90*b*, so that power generated by the low-reliability cell group is supplied to the non-significant loads.

When the power-shortage probability determined by the surplus-power determination section 80 exceeds a predetermined value, the cell switch section 26 may split the plurality of fuel cells 10 into the high-reliability cell group and the low-reliability cell group. In this case, when the cell switch section 26 splits the plurality of fuel cells into the high-reliability cell group and the low-reliability cell group, the load control section 92 connects predetermined significant ones of the plurality of loads 120 to the high-reliability cell group and connects non-significant loads other than the significant loads to the low-reliability cell group.

When the total demand of the significant loads is greater than the total power generation capacity of the high-reliability cell group, the cell switch section 26 may allow the fuel cell 10, which belongs to the low-reliability cell group and has the greatest maximum power generation capacity, to belong to the high-reliability cell group. In this case, until the total power generation capacity of the high-reliability cell group exceeds the total demand of the significant loads, the cell switch section 26 sequentially switches the fuel cells 10 having a great power generation capacity from the low-reliability cell group to the high-reliability cell group.

When the total demand of the significant loads is greater than the total power generation capacity of the high-reliability cell group, the load control section 92 may connect the predetermined load 120 out of the significant loads, the predetermined load 120 having the lowest significance, to the low-reliability cell group as non-significant loads. In this case, since the total demand of the significant loads becomes less than the total power generation capacity of the high-reliability cell group, the load control section 92 sequentially switches the significant loads having a low significance to non-significant loads. By such an operation, the power can be supplied stably to the significant loads.

The significance of each load 120 may be predetermined by the user, or the significance may vary on a time basis. For example, the significance of each load 120 may vary on the basis of daytime and nighttime, season, or so on.

Figure 3:
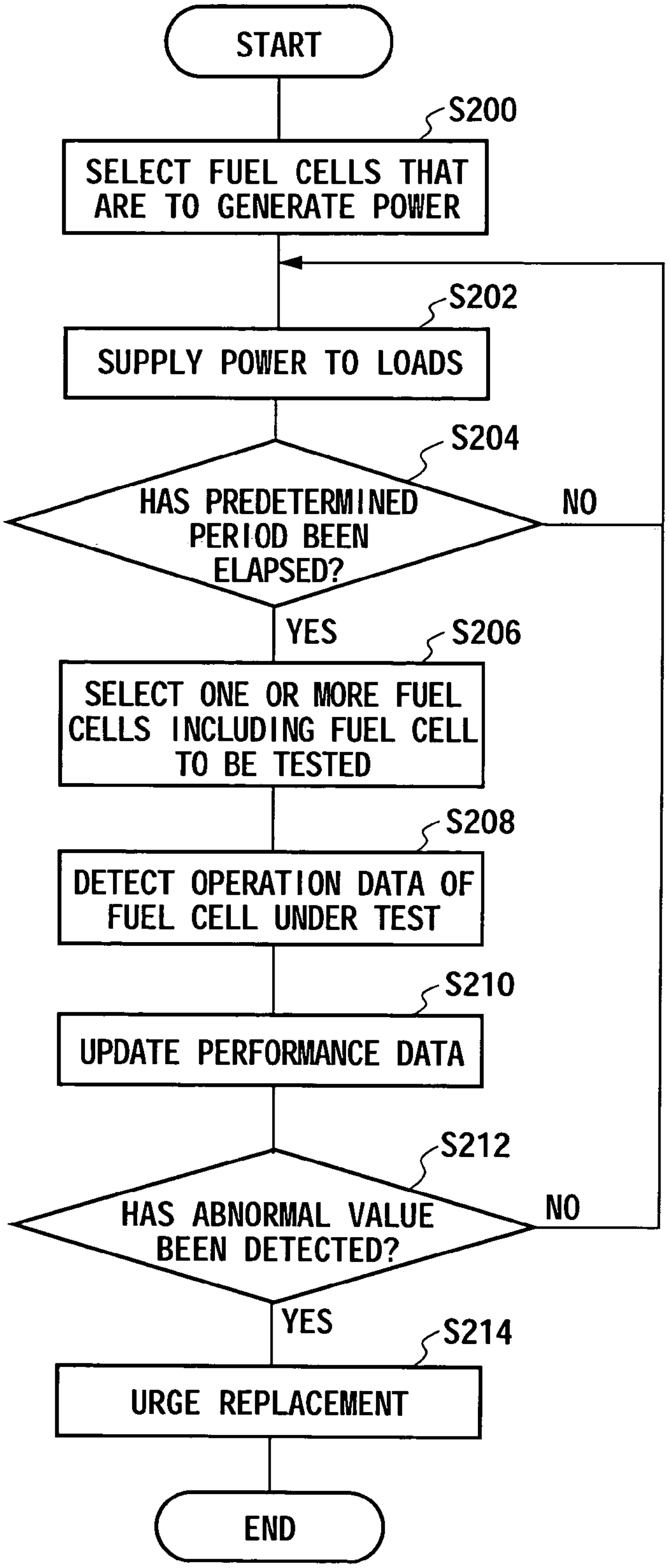
FIG. 3 is a flow chart showing one example of processing for performance test of a fuel cell 10.

FIG. 3 is a flow chart showing one example of processing for a performance test of the fuel cells 10. First, during a normal operation, the selection section 42 selects the fuel cells 10 to cause the selected fuel cells to generate power (in S200), and the power is supplied to the loads 120 (in S202). Next, a determination is made (in S204) as to whether or not a predetermined period of time has elapsed after previous performance test is done. When the predetermined period of time has not elapsed, the selected fuel cells 10 continue to supply power (in S202). When the predetermined period of time has elapsed, the selection section 42 selects one or more fuel cells 10 including the fuel cell 10 to be tested, and causes the selected fuel cell(s) 10 to generate power (in S206).

Next, the power-generation-amount detection section 70 detects operation data, such as start-up time, and the amount of power generated by the fuel cell under test (in S208). According to the detected operation data, the update section 50 updates performance values stored on the performance storage section 60 (in S210). At this point, a determination is made as to whether or not a performance value or a power-failure probability of the fuel cell is abnormal. When it is not abnormal, the selected fuel cell 10 continues to supply power (in S202).

When it is decided to be abnormal in S212, an alarm indicating the abnormality is issued to outside (in S214) For example, in S214, an alarm is issued to outside, the alarm indicating the replacement of the fuel cell from which the abnormality has been detected, and the processing is finished.

Figure 4:
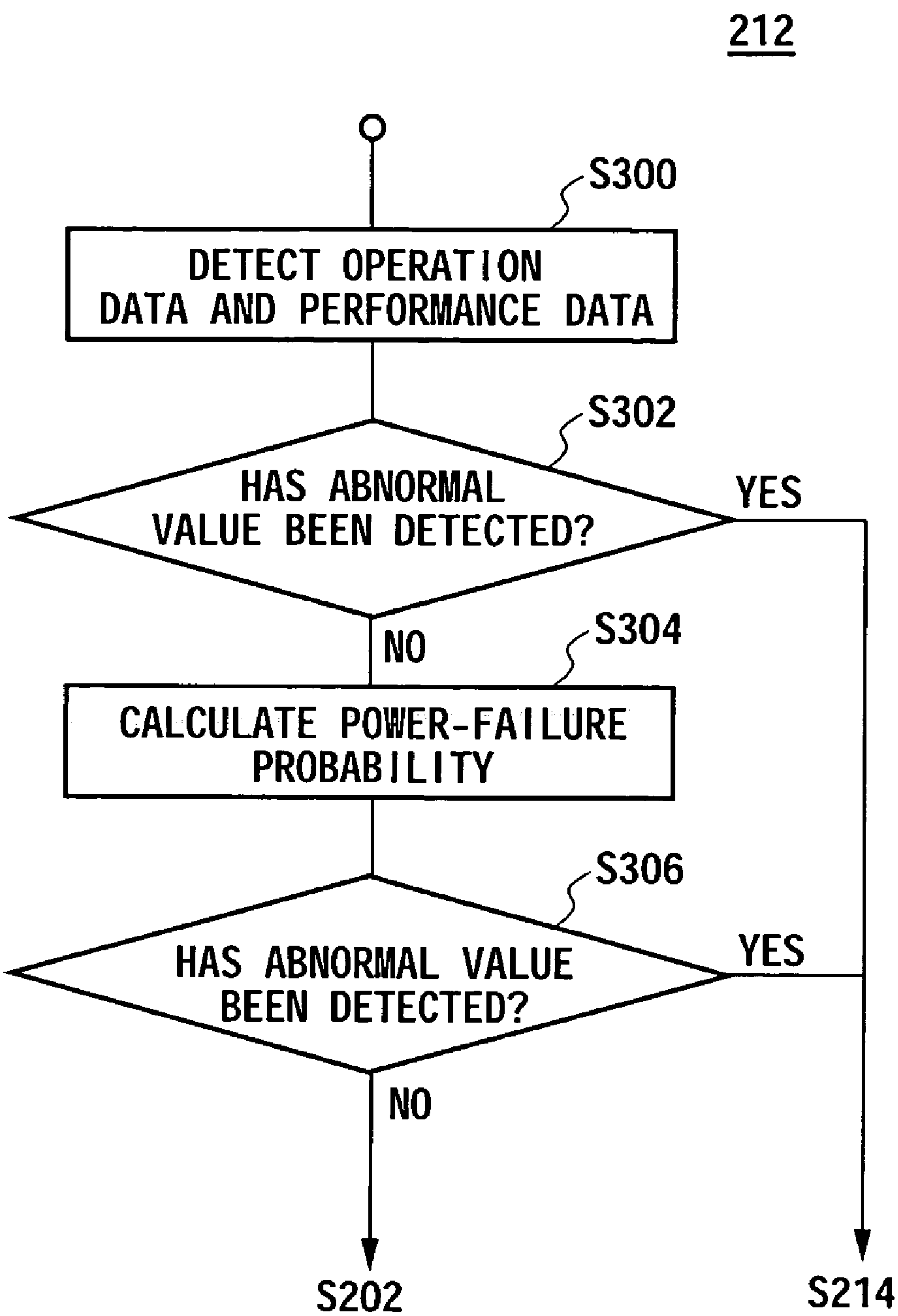
FIG. 4 is a flow chart showing one example of detailed processing of S212.

FIG. 4 is a flow chart showing one example of the detail of the step S212. First, the detected operation data of the fuel cell 10 is compared with a reference value (in S300). A determination is then made as to whether the operation data of the fuel cell 10 is abnormal or not (in S302). When it is abnormal, an alarm indicating the replacement of that fuel cell is issued to outside (in S214), as described in FIG. 3.

When abnormality is not detected in S302, the surplus power of the power supply system 100 is determined based on the updated performance value, and the probability of power failure, in which power supplied to the power supply system 100 is insufficient, is calculated (in S304). When the power-failure probability is abnormal, i.e., the power-failure probability exceeds a predetermined reference value, an alarm indicating the abnormality is issued to outside (in S214). When the power-failure probability is less than the reference value, the processing proceeds to S202.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

As is obvious from the above description, the power supply system according to the present invention can efficiently test a plurality of fuel cells while supplying power to loads stably. Therefore, the current maximum power generation capability can be recognized easily.

What is claimed is:

1. A power supply system that supplies power to loads, comprising:

- a plurality of fuel cells for generating electric power and supplying the electric power to the loads;
- a performance storage section for storing a maximum power value indicating a maximum value of a power generation ability of each of said fuel cells;
- a test device for sequentially performing maximum power generation testing on at least one of said fuel cells at a predetermined time interval;
- an update section for updating the maximum power value of each of said fuel cells according to a result of the performance test, wherein the maximum power value is stored on said performance storage section;
- a power-generation-amount detection section for detecting a total of amounts of power generated and supplied by said fuel cells to the loads; and
- a surplus-power determination section for determining surplus power, which can be excessively generated by the power supply system, at the predetermined time interval based on a difference between a total of the maximum power values stored on said performance storage section and the total of amounts of the generated power.

2. The power supply system as claimed in claim 1, further comprising

- a selection section for selecting one or more fuel cells including said fuel cell to be tested by said test device from said plurality of fuel cells, so that the total of the maximum power values of said selected fuel cells is greater than the demand of the loads and the number of selected fuel cells may be a minimum, to cause said selected fuel cell to generate power; and
- a selection change section for sequentially changing said fuel cell selected by said selection section at the predetermined time interval to cause said test device to test all said fuel cells.

3. The power supply system as claimed in claim 2, wherein said selection section preferentially selects said fuel cell having large maximum power value as well as said fuel cell to be tested.

4. The power supply system as claimed in claim 2, wherein said selection section does not select said fuel cell when the maximum power value of said fuel cell becomes less than a predetermined value.

5. The power supply system as claimed in claim 4, further comprising a request receiving section for receiving a request for power from outside in a case of emergency, wherein,

- said selection section causes said fuel cell, of which the maximum power value became less than the predetermined value, to generate power and supplies the generated power to outside only in the case of emergency.

6. The power supply system as claimed in claim 1, further comprising a control section, wherein, when a request requesting a power less than the surplus power is received from outside, said control section causes said fuel cells to generate power according to the request from the outside and to supply the power to outside.

7. The power supply system as claimed in claim 1, wherein said surplus-power determination section calculates a probability of shortage of the power to be supplied to the loads based on the surplus power, and an alarm indicating the power shortage is issued to outside when the probability of power shortage to be supplied to the loads exceeds a predetermined value.

8. The power supply system as claimed in claim 7, wherein said surplus-power determination section calculates the probability of shortage of the power to be supplied to the loads based on power transition data, which is an estimate of transition of demand of the loads.

9. The power supply system as claimed in claim 7, wherein said performance storage section further stores a failure probability of each fuel cell, and

- said surplus-power determination section calculates the probability of shortage of the power to be supplied to the loads based on the failure probability.

10. The power supply system as claimed in claim 7, further comprising a load control section, wherein, when power is supplied to said plurality of loads and the probability of power shortage is greater than or equal to a predetermined value, said load control section acts so as not to supply the power to predetermined non-significant loads among the plurality of loads.

11. The power supply system as claimed in claim 8, further comprising a load control section, wherein, when power is supplied to said plurality of loads and the probability of power shortage is greater than or equal to a predetermined value, said load control section acts so as not to supply the power to predetermined non-significant loads among the plurality of loads.

12. The power supply system as claimed in claim 9, further comprising a load control section, wherein, when power is supplied to said plurality of loads and the probability of power shortage is greater than or equal to a predetermined value, said load control section acts so as not to supply the power to predetermined non-significant loads among the plurality of loads.

13. The power supply system as claimed in one of claim 7, further comprising a cell switch section for splitting said plurality of fuel cells into a high-reliability cell group of which maximum power value is greater than or equal to a predetermined value and a low-reliability cell group of which maximum power value is less than the predetermined value, to supply power to the plurality of loads; and

- a load control section for connecting predetermined significant loads among the plurality of loads to the high-reliability cell group and connecting non-significant loads other than the significant loads to the low-reliability cell group.

14. The power supply system as claimed in one of claim 7, further comprising a cell switch section for splitting said plurality of fuel cells into a high-reliability cell group of which maximum power value is greater than or equal to a predetermined value and a low-reliability cell group of which maximum power value is less than the predetermined value, to supply power to the plurality of loads; and a load control section for connecting predetermined significant loads among the plurality of loads to the high-reliability cell group and connecting non-significant loads other than the significant loads to the low-reliability cell group.

15. The power supply system as claimed in one of claim 7, further comprising a cell switch section for splitting said plurality of fuel cells into a high-reliability cell group of which maximum power value is greater than or equal to a predetermined value and a low-reliability cell group of which maximum power value is less than the predetermined value, to supply power to the plurality of loads; and a load control section for connecting predetermined significant loads among the plurality of loads to the high-reliability cell group and connecting non-significant loads other than the significant loads to the low-reliability cell group.

16. The power supply system as claimed in claim 13, wherein, when the probability of power shortage exceeds a predetermined value, said cell switch section splits said plurality of fuel cells into the high-reliability cell group and the low-reliability cell group; and when said cell switch section splits said plurality of fuel cells into the high-reliability cell group and the low-reliability cell group, said load control section connects predetermined significant loads among the plurality of loads to the high-reliability cell group and connects non-significant loads other than the significant loads to the low-reliability cell group.

17. The power supply system as claimed in claim 13, wherein, when a total demand of the significant loads is greater than a total power generation capacity of the high-reliability cell group, the cell switch section causes said fuel cell, which has the greatest maximum power generation capacity among said fuel cells belonging to the low-reliability cell group, to belong to the high-reliability cell group.

18. The power supply system as claimed in claim 13, wherein, when a total demand of the significant loads is greater than a total power generation capacity of the high-reliability cell group, said load control section connects the predetermined load, which has a lowest significance among the significant loads, to the low-reliability cell group as the non-significant loads.

19. The power supply system as claimed in claim 13, further comprising:

a high-reliability power network, to which the high-reliability cell group and the significant loads are connected, for supplying power generated by the high-reliability cell group to the significant loads; and a low-reliability power network, to which the low-reliability cell group and the non-significant loads are connected, for supplying power generated by the low-reliability cell group to the non-significant loads.

20. The power supply system as claimed in claim 14, wherein, when the probability of power shortage exceeds a predetermined value, said cell switch section splits said plurality of fuel cells into the high-reliability cell group and the low-reliability cell group; and when said cell switch section splits said plurality of fuel cells into the high-reliability cell group and the low-reliability cell group, said load control section connects predetermined significant loads among the plurality of loads to the high-reliability cell group and connects non-significant loads other than the significant loads to the low-reliability cell group.

21. The power supply system as claimed in claim 14, wherein, when a total demand of the significant loads is greater than a total power generation capacity of the high-reliability cell group, the cell switch section causes said fuel cell, which has the greatest maximum power generation capacity among said fuel cells belonging to the low-reliability cell group, to belong to the high-reliability cell group.

22. The power supply system as claimed in claim 14, wherein, when a total demand of the significant loads is greater than a total power generation capacity of the high-reliability cell group, said load control section connects the predetermined load, which has a lowest significance among the significant loads, to the low-reliability cell group as the non-significant loads.

23. The power supply system as claimed in claim 14, further comprising:

a high-reliability power network, to which the high-reliability cell group and the significant loads are connected, for supplying power generated by the high-reliability cell group to the significant loads; and a low-reliability power network, to which the low-reliability cell group and the non-significant loads are connected, for supplying power generated by the low-reliability cell group to the non-significant loads.

24. The power supply system as claimed in claim 15, wherein, when the probability of power shortage exceeds a predetermined value, said cell switch section splits said plurality of fuel cells into the high-reliability cell group and the low-reliability cell group; and when said cell switch section splits said plurality of fuel cells into the high-reliability cell group and the low-reliability cell group, said load control section connects predetermined significant loads among the plurality of loads to the high-reliability cell group and connects non-significant loads other than the significant loads to the low-reliability cell group.

25. The power supply system as claimed in claim 15, wherein, when a total demand of the significant loads is greater than a total power generation capacity of the high-reliability cell group, the cell switch section causes said fuel cell, which has the greatest maximum power generation capacity among said fuel cells belonging to the low-reliability cell group, to belong to the high-reliability cell group.

26. The power supply system as claimed in claim 15, wherein, when a total demand of the significant loads is greater than a total power generation capacity of the high-reliability cell group, said load control section connects the predetermined load, which has a lowest significance among the significant loads, to the low-reliability cell group as the non-significant loads.

27. The power supply system as claimed in claim 15, further comprising:

a high-reliability power network, to which the high-reliability cell group and the significant loads are connected, for supplying power generated by the high-reliability cell group to the significant loads; and a low-reliability power network, to which the low-reliability cell group and the non-significant loads are connected, for supplying power generated by the low-reliability cell group to the non-significant loads.

* * * * *